United States Patent
Chowdhury et al.

(10) Patent No.: US 11,225,052 B2
(45) Date of Patent: Jan. 18, 2022

(54) LAMINATED STRUCTURES AND METHODS OF MANUFACTURING LAMINATED STRUCTURES

(71) Applicant: CORNING INCORPORATED, Corning, NY (US)

(72) Inventors: Dipakbin Qasem Chowdhury, Corning, NY (US); William Keith Fisher, Corning, NY (US); Kiat Chyai Kang, Painted Post, NY (US); Michael Aaron McDonald, Painted Post, NY (US); Chunhe Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 192 days.

(21) Appl. No.: 16/585,885

(22) Filed: Sep. 27, 2019

(65) Prior Publication Data
US 2020/0023611 A1    Jan. 23, 2020

Related U.S. Application Data

(63) Continuation of application No. 13/547,092, filed on Jul. 12, 2012, now abandoned.

(51) Int. Cl.
*B32B 15/08* (2006.01)
*B32B 17/10* (2006.01)
(Continued)

(52) U.S. Cl.
CPC ............... *B32B 15/08* (2013.01); *B32B 7/02* (2013.01); *B32B 15/18* (2013.01); *B32B 17/061* (2013.01);
(Continued)

(58) Field of Classification Search
CPC ..... B32B 17/061; B32B 15/04–15/098; B32B 15/18–20; B32B 7/00–7/14
See application file for complete search history.

(56) References Cited

U.S. PATENT DOCUMENTS 3,799,817 A    3/1974  Laethem
3,822,122 A    7/1974  Plumat et al.
(Continued)

FOREIGN PATENT DOCUMENTS

CN    101600846 A    12/2009
GB      2011316 A     7/1979
(Continued)

OTHER PUBLICATIONS

Davis, J.R. "Aluminum and Aluminum Alloys", Alloying: Understanding the Basics, ASM International, (2001); pp. 351-416.*
(Continued)

*Primary Examiner* — Prashant J Khatri (57) ABSTRACT

Laminated structures include a thin glass sheet with a thickness of less than 600 μm being attached to a metal sheet with an adhesive layer including a thickness of about 100 μm or less. These laminated structures can include planar or curved shapes. Methods of manufacturing a laminated structure are also provided including the step of attaching a glass sheet with a thickness of less than 600 μm to a metal sheet with an adhesive layer including a thickness of about 300 μm or less.

18 Claims, 5 Drawing Sheets

(51) Int. Cl.
- B32B 15/18 (2006.01)
- B32B 17/06 (2006.01)
- B32B 7/02 (2019.01)
- B32B 38/00 (2006.01)

(52) U.S. Cl.
CPC .. *B32B 17/10018* (2013.01); *B32B 17/10119* (2013.01); *B32B 38/0012* (2013.01); *Y10T 156/10* (2015.01); *Y10T 156/1028* (2015.01); *Y10T 156/1044* (2015.01); *Y10T 428/24967* (2015.01)

(56) References Cited

U.S. PATENT DOCUMENTS

| | | | |
|---|---|---|---|
| 4,095,968 | A | 6/1978 | Bristow |
| 4,337,997 | A | 7/1982 | Sadoune et al. |
| 4,465,734 | A | 8/1984 | Laroche et al. |
| 4,512,823 | A | 4/1985 | Howe et al. |
| 4,663,228 | A * | 5/1987 | Bolton .............. B32B 17/10018 428/334 |
| 4,678,292 | A | 7/1987 | Miyatani et al. |
| 4,985,099 | A | 1/1991 | Mertens et al. |
| 6,287,674 | B1 | 9/2001 | Verlinden et al. |
| 6,309,901 | B1 | 10/2001 | Tahon et al. |
| 6,833,665 | B2 | 12/2004 | Wachi et al. |
| 6,861,136 | B2 | 3/2005 | Verlinden et al. |
| 8,375,657 | B2 | 2/2013 | Buchwald et al. |
| 2004/0069770 | A1 | 4/2004 | Cary et al. |
| 2005/0266251 | A1 | 12/2005 | Rita |
| 2006/0134394 | A1 | 6/2006 | Burroughes et al. |
| 2008/0145610 | A1 | 6/2008 | Muller et al. |
| 2008/0290096 | A1 | 11/2008 | Fiumidinisi |
| 2010/0031590 | A1 | 2/2010 | Buchwald et al. |
| 2010/0143681 | A1 | 6/2010 | Yano et al. |
| 2011/0032205 | A1 | 2/2011 | David |
| 2012/0060559 | A1 | 3/2012 | Boussaad et al. |
| 2012/0064352 | A1 | 3/2012 | Boussaad et al. |
| 2013/0164483 | A1 | 6/2013 | Cites et al. |
| 2013/0196163 | A1 * | 8/2013 | Swanson .............. B32B 17/06 428/426 |
| 2015/0246507 | A1 | 9/2015 | Brown et al. |

FOREIGN PATENT DOCUMENTS

| | | |
|---|---|---|
| GB | 2074089 A | 10/1981 |
| JP | 55-106402 A | 8/1980 |
| JP | 57-185402 A | 11/1982 |
| JP | 57185170 A | 11/1982 |
| JP | 01136886 A | 5/1989 |
| JP | 03016746 A | 1/1991 |
| JP | 03016747 A | 1/1991 |
| JP | 11259914 A | 9/1999 |
| JP | 2000203898 A | 7/2000 |
| JP | 2000229372 A | 8/2000 |
| JP | 2008-511470 A | 4/2008 |
| JP | 2009-511372 A | 3/2009 |
| JP | 2009186645 A | 8/2009 |
| JP | 2011219352 A | 11/2011 |
| JP | 2012021743 A | 2/2012 |
| JP | 2013234832 A | 11/2013 |
| WO | 03022578 A1 | 3/2003 |
| WO | 2011090004 A1 | 7/2011 |
| WO | 2012037286 A1 | 3/2012 |
| WO | 2012062311 A2 | 5/2012 |
| WO | 2014166082 A1 | 10/2014 |

OTHER PUBLICATIONS

English Translation of CN201810348266.3 Office Action dated May 26, 2020; 12 Pages; Chinese Patent Office.
Korean Patent Application No. 20207005209; English Translation of the Office Action dated Mar. 13, 2020; Korea Patent Office; 3 Pgs.
Japanese Patent Application No. 2018149141; Notice of Allowance dated Feb. 5, 2020; Japan Patent Office; 3 Pgs.
International Search Report and Written Opinion of the International Searching Authority; PCT/US2013/044627; dated Sep. 9, 2013, 12 Pages.
Iwanami Dictionary of Physical and Chemical Science in Japanese.
JP2015521620 Notice of Grounds for Rejection dated Feb. 23, 2016.
JP2016232780 Office Action dated Dec. 5, 2017, Japan Patent Office.
McGrawhill Dictionary of Scientific and Technical Terms in Japanese.
Machine Translation of JP2018149141 Office Action dated Jul. 3, 2019, Japan Patent Office, 3 Pgs.
Chinese Patent Application No. 201810348266.3, Office Action dated Jan. 14, 2021; 7 pages (2 pages of English Translation and 5 pages of Original Document); Chinese Patent Office.

* cited by examiner

LAMINATED STRUCTURES AND METHODS OF MANUFACTURING LAMINATED STRUCTURES

This application is a continuation of U.S. patent application Ser. No. 13/547,092, filed Jul. 12, 2012, the content of which is relied upon and incorporated herein by reference in its entirety, and the benefit of priority under 35 U.S.C. § 120 is hereby claimed.

BACKGROUND

Field of the Invention

The present invention relates generally to laminated structures and methods of manufacturing laminated structures and, more particularly, to laminated structures including a thin or ultra thin glass sheet adhered to a metal sheet with an adhesive layer and methods of manufacturing a laminated structure including the step of attaching a glass sheet to a metal sheet with an adhesive layer.

Technical Background

It is known to provide a variety of apparatus, such as appliances, with an outer housing including a metal sheet. For example, typically, relatively thin metal sheets are used as an outer housing surface for an appliance. As such, the metal sheet provides a protection while also maintaining the outer appearance of the appliance.

SUMMARY

In one example aspect, a laminated structure comprises a metal sheet and a thin glass sheet including a thickness T1 of less than 600 µm. The laminated structure further includes an adhesive layer attaching the glass sheet to the metal sheet. The adhesive layer includes a thickness T2 of about 300 µm or less.

In one example of the aspect, the thickness T1 of the glass sheet is about 300 µm or less, 250 µm or less, about 200 µm or less, 150 µm or less such as from about 50 µm to about 300 µm.

In yet another example of the aspect, the glass sheet comprises glass selected from the group consisting of soda lime glass, borosilicate and alkaline earth boro-aluminosilicate.

In still another example of the aspect, the thickness T2 of the adhesive layer is from about 20 µm to about 75 µm, such as from about 25 µm to about 50 µm, or 25 µm or less, 100 µm or less, or 300 µm or less.

In still another example of the aspect, the thickness T2 of the adhesive layer is 1.5 mm or less.

In another example of the aspect, the adhesive layer is substantially transparent. The transparent adhesive layer may be clear, colored or provided with decorative patter or print.

In another example of the aspect, the adhesive layer is translucent or even opaque, and may be of any color or provided with a decorative pattern or print.

In still another example of the aspect, the metal sheet comprises steel.

In a further example of the aspect, the metal sheet has a thickness T3 from about 0.5 mm to about 2 mm.

In another example aspect, a method of manufacturing a laminated structure comprises the step (I) of providing a metal sheet and the step (II) of providing a thin glass sheet including a thickness T1 of less than 600 µm. The method further includes the step (III) of attaching the glass sheet to the metal sheet with an adhesive layer to form the laminated structure. After the glass sheet is attached to the metal sheet, the adhesive layer includes a thickness T2 of about 300 µm or less.

In one example of the aspect, step (III) includes attaching the glass sheet to the metal sheet such that a shape of the glass sheet provided during step (II) is changed to substantially match a shape of the metal sheet provided during step (I).

In another example of the aspect, step (III) includes bending the glass sheet to conform to a shape of the metal sheet.

In still another example of the aspect, after step (III), further including the step of bending the laminated structure to a desired shape.

In a further example of the aspect, step (II) provides the thickness T1 of the glass sheet from about 300 µm or less, such as from about 50 µm to about 300 µm.

In still a further example of the aspect, step (II) provides the glass sheet with glass selected from the group consisting of soda lime glass, borosilicate and alkaline earth boro-aluminosilicate.

In yet a further example of the aspect, step (III) provides the thickness T2 of the adhesive layer from about 20 µm to about 75 µm.

In another example aspect, a method of manufacturing a laminated structure comprises the step (I) of providing a metal sheet with a thickness from about 0.5 mm to about 2 mm, and the step (II) of providing a thin glass sheet including a thickness T1 from about 50 µm to about 300 µm. The method further includes the step (III) of attaching the glass sheet to the metal sheet with an adhesive layer to form the laminated structure. After the glass sheet is attached to the metal sheet, the adhesive layer includes a thickness T2 of about 300 µm or less.

In one example of the aspect, step (III) includes attaching the glass sheet to the metal sheet such that a shape of the glass sheet provided during step (II) is changed to substantially match a shape of the metal sheet provided during step (I).

In another example of the aspect, (III) provides the thickness T2 of the adhesive layer from about 20 µm to about 75 µm.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Figure 1:
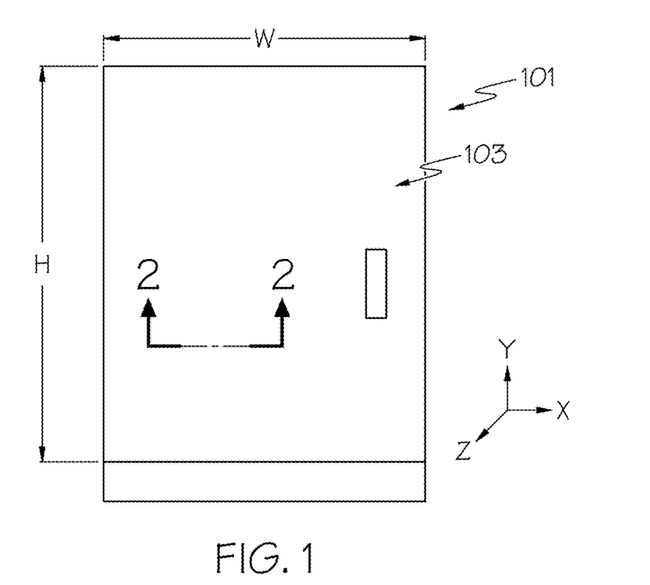
FIG. 1 is a schematic view of a cabinet incorporating a laminated structure in accordance with aspects of the disclosure.

Laminated structures may be used in a wide range of applications in accordance with aspects of the disclosure. For example, laminated structures may be used in various architectural applications such as siding, decorative panels, cabinet installations, wall coverings or other architectural applications. In further examples, the laminated structures may be used for furniture items and/or household appliances. For instance, the laminated structures may be incorporated as outer panels of a cabinet or other furniture and/or household appliance. For instance, FIG. 1 illustrates a schematic view of a cabinet 101 incorporating a laminated structure 103 in accordance with aspects of the disclosure. In on example, the cabinet 101 can be incorporated in a wall unit for storage. In another example, the cabinet can be refrigerated. For instance, the cabinet 101 can comprise a refrigerator and/or a freezer although various other nonrefrigerated examples may be alternatively provided.

Figure 2:
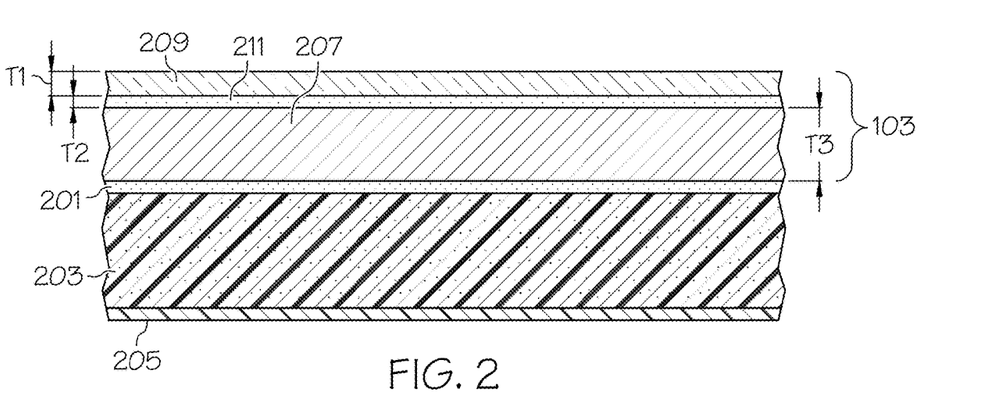
FIG. 2 is a cross sectional view of the cabinet along line 2-2 of FIG. 1 illustrating a laminated structure incorporated as part of a wall of the cabinet.

FIG. 2 illustrates an example cross section along line 2-2 of FIG. 1 for just one example wherein the laminated structure has been incorporated as part of a closure of a refrigerated cabinet (e.g., refrigerator and/or freezer). Indeed, as shown in FIG. 2, the laminated structure 103 may optionally be mounted with an adhesive 201 to an insulating layer 203 such as expanded polystyrene. Moreover, the interior chamber of the refrigerated cabinet may be defined by an inner skin 205, such as a plastic formed skin configured to form inner skin of the inner chamber.

In further examples, the laminated structure 103 may be provided in various other configurations and does not necessarily require backing material such as the illustrated insulating layer 203 and/or inner skin 205. In fact, some examples may employ the laminated structure 103 to provide the entire construction in use.

As shown in FIG. 2, the laminated structure can include a metal sheet 207 that can comprise a wide range of metal types and/or a wide range of thicknesses and configurations. For instance, the metal sheet 207 can comprise steel, aluminum or other metal type. In one particular example, the metal sheet can comprise stainless steel. Stainless steel can have suitable application for outer panel constructions providing desired protection while resisting corrosion over time. In other examples, the metal may be pre-laminated with protective or decorative films, or decorated or pretreated, for example anodized aluminum. The surface of the metal may be treated for decorative purposes, for example steel or aluminum sheets may be brushed, acid etched, sand blasted, etc. in order to provide a decorative pattern or appearance to the surface of the metal sheet.

The metal sheet 207 can include a wide range of thicknesses depending on the particular application. Relatively thin metal sheets may be used in applications to reduce material costs and/or weight of the laminated structure while still providing sufficient resistance to deformation. In further examples, relatively thick metal sheets may be used in applications where further support is required to maintain the mechanical integrity of the laminated structure. In some examples, the thicknesses may range from 25 Gauge metal sheet (e.g., about 0.5 mm) up to 12 Gauge metal sheet (i.e., about 2 mm). As such, referring to FIG. 2, the thickness T3 of the metal sheet 207 can be from about 0.5 mm to about 2 mm although other thicknesses may be provided depending on the particular application.

Figure 3:
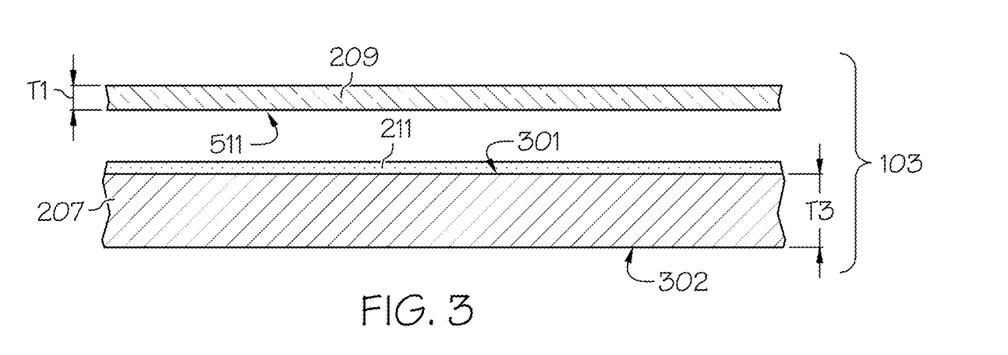
FIG. 3 is a cross sectional view of a glass sheet, a metal sheet and an adhesive layer configured to be laminated together to form a first example laminated structure.

The metal sheet 207 can also have a wide range of configurations in accordance with aspects of the disclosure. For example, as shown in FIG. 3, the metal sheet 207 can comprise a substantially planar metal sheet configuration including a first substantially flat outer surface 301 and a substantially flat inner surface 302. As shown, in some examples, the flat surfaces 301, 302 can be substantially parallel to one another to define the thickness T3 therebetween that remains substantially constant throughout a portion, such as substantially all, of the metal sheet 207. Although not shown, the substantially flat surfaces 301, 302 may be angled relative to one another such that the thickness T3 is not substantially the same along the entire metal sheet 207.

Figure 4:
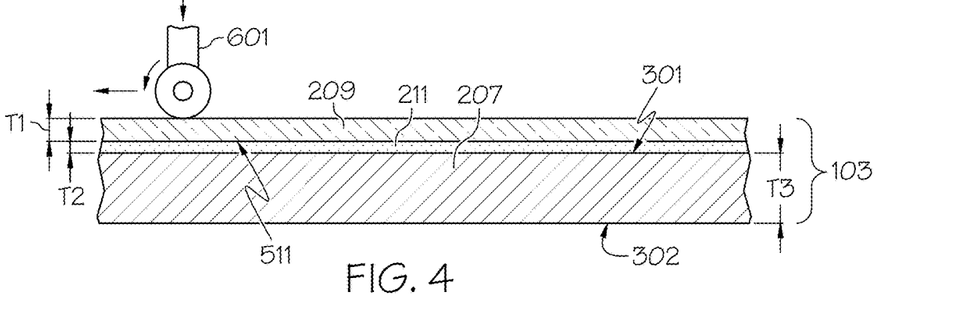
FIG. 4 is a view of a glass sheet, a metal sheet and an adhesive layer of FIG. 3 being laminated together into the first example laminated structure.
Figure 5:
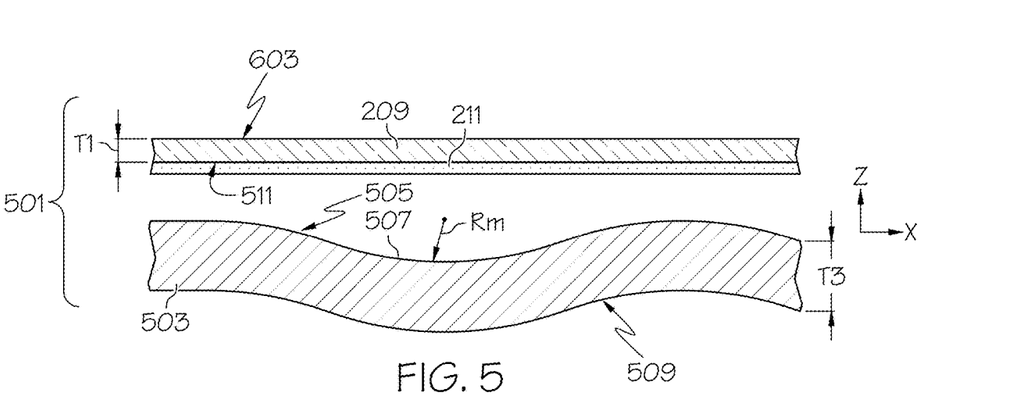
FIG. 5 is a cross sectional view of a glass sheet, a metal sheet and an adhesive layer configured to be laminated together to form a second example laminated structure.
Figure 6:
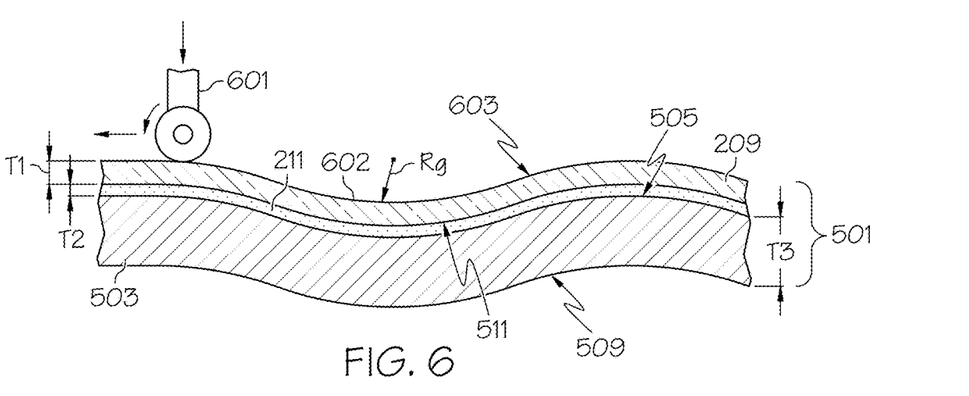
FIG. 6 is a view of a glass sheet, a metal sheet and an adhesive layer of FIG. 5 being laminated together into the second example laminated structure.

In an alternative example, FIGS. 5 and 6 illustrate an alternative laminated structure 501 including a metal sheet 503 that may have a similar wide range of metal types and/or a wide range of thicknesses as discussed with respect to the metal sheet 207 shown in FIGS. 2-4. However, as shown in FIGS. 5 and 6, the metal sheet 503 may include an alternative configuration that may not be flat along at least a portion of the metal sheet. For an illustrative example, the metal sheet 503 can have undulations extending along the X-axis, such as the width "W" of laminated structure 103 shown in FIG. 1. In addition, or alternatively, the metal sheet 503 can also include similar, such as identical, undulations extending along the Y-axis, such as the height "H" of the laminated structure 103 shown in FIG. 1. As such, in some examples, the metal sheet 503 can include a curved metal sheet 503 with curved portions extending along the X-axis and/or Y-axis of the glass sheet. In some examples, a single array of curvatures may be provided along the X-axis and/or Y-axis. In further examples, a matrix of curvatures may be provided along both the X-axis and the Y-axis. Furthermore, a single curved surface and/or a plurality of curved surfaces maybe provided in further examples.

Referring to FIG. 5, the metal sheet 503 can include an outer surface 505 with a plurality of curves 507 including a radius "Rm" that may include a wide range of values discussed more fully below. The metal sheet 503 can also include an inner surface 509 that follows the outer surface 505 to define a thickness T3 therebetween that remains substantially constant along a portion, such as substantially the entire metal sheet 503. In further examples, that thickness T3 may vary along the metal sheet 503. For example, the inner surface 509 may be substantially flat while the outer surface 505 includes a curved surface. In such examples, the substantially flat nature of the inner surface 509 may allow for mounting on a similar substantially flat mounting member while still exposing the outer surface 505 with the desired curved characteristics.

As further illustrated in FIG. 2, the laminated structure 103 can include a glass sheet 209 that can comprise a wide range of glass types and/or a wide range of thicknesses and configurations. In one example, the glass sheet 209 can be from various families of glass including soda lime glass, borosilicate and alkaline earth boro-aluminosilicate although other types of glass sheets may be used in further examples. To achieve 50 µm to 300 µm glass thickness, various glass forming methods may be deployed such as slot draw or fusion draw processes. For instance, a fusion draw process can be provided to obtain a pristine surface. In some examples, display quality glass sheets may be used to provide a transparent covering over the outer surface 301, 505 of the metal sheets 207, 503. Providing display quality glass can allow the aesthetic appearance of the outer surface of the metal sheets to be preserved. At the same time, the glass sheet 209 can help maintain the pristine surface quality of the outer surface 301, 505 of the metal sheet 207, 503. Indeed, scratches, smudging or other imperfections can be avoided due to the protective glass sheet laminated with the metal sheet.

In some examples, the glass sheet 209 can include a thickness T1 of less than 600 µm, such as about 300 µm or less, 250 µm or less, about 200 µm or less, 150 µm or less, such as from about 50 µm to about 300 µm. Providing relatively thin glass sheets can reduce costs of materials, reduce optical refraction and can help in the laminating procedure. Various techniques can be used to generate the glass sheet 209. For example, fusion down draw techniques, fusion updraw techniques, slot draw techniques or other processes may be used to provide a glass ribbon that may be processed into glass sheets having the desired dimensional configuration.

As further shown in FIGS. 2-6, the glass laminate structure further includes an adhesive layer 211 that attaches the glass sheet 209 to the metal sheet 207, 503. The adhesive layer includes a thickness T2 of about 300 µm or less, such as from about 20 µm to about 200 µm, such as from about 20 µm to about 100 µm, such as from about 20 µm to about 75 µm, such as from about 25 µm to about 50 µm although other thicknesses may be used in further examples. As described more fully below, adhesive layers 211 having a reduced thickness can enhance the strength of the laminate structure.

The adhesive layer 211 can comprise an optical clear adhesive to form an adhesive layer 211 that is substantially transparent, although opaque and possibly colored adhesive layers maybe provided in further examples. Providing a substantially transparent adhesive layer 211 can allow clear viewing of the outer surface 301, 505 of the metal sheets 207, 503.

Figure 7:
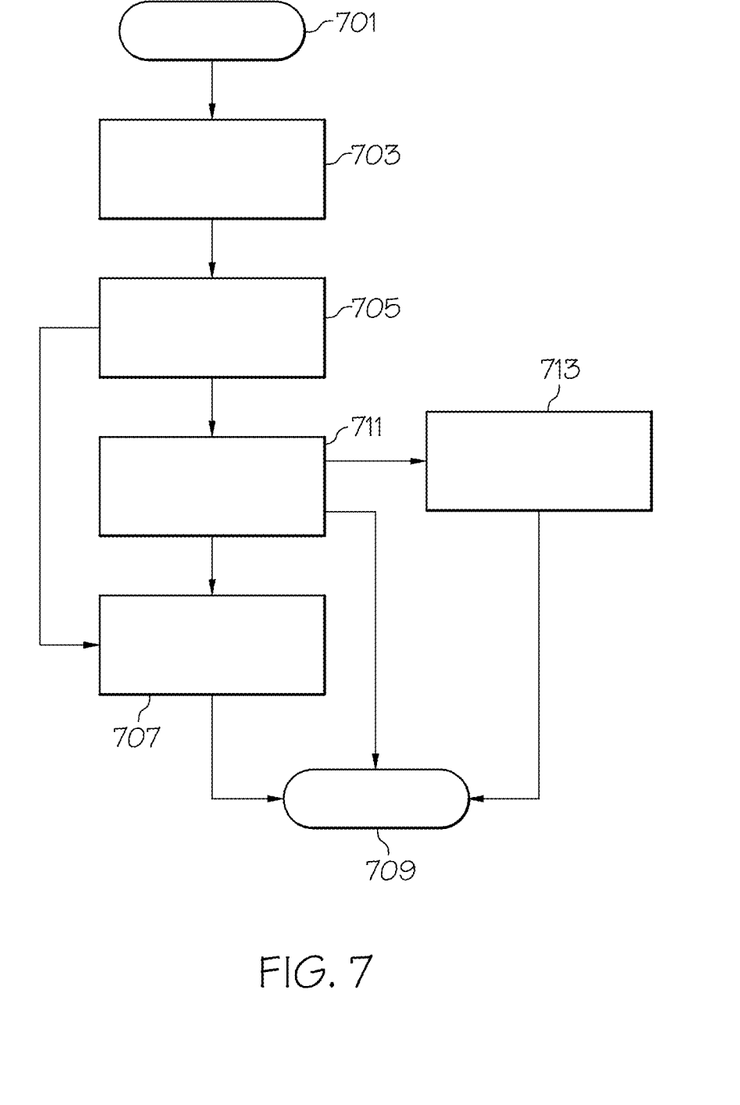
FIG. 7 is a flow chart illustrating example methods of manufacturing the laminated structure.

Methods of manufacturing a laminated structure will now be described. FIG. 7 represents steps of example methods with the understanding that the illustrated steps maybe carried out in a different order unless otherwise noted. Moreover, additional steps maybe provided that are not illustrated unless otherwise stated. As shown in FIG. 7, the method can optionally begin at 701 with a step 703 of providing the metal sheet 207, 503. In one example, the metal sheet 207 includes a substantially flat metal sheet. In further examples, the metal sheet 207 may be formed with a curved surface with curves 507 having various configurations. As mentioned previously, the metal sheet 207, 503 can include a wide ranges of thicknesses T3, for example, from about 0.5 mm to about 2 mm although other thicknesses may be provided in further examples.

The method can also include the step 705 of providing the glass sheet 209 including the thickness T1 of less than 600 µm, such as from about 300 µm or less, such as from about 50 µm to about 300 µm. The glass sheet 209 can be provided with glass selected from various families of glass including soda lime glass, borosilicate and alkaline earth boro-aluminosilicate although other glass compositions may be used in further examples.

The method can further include the step of attaching the glass sheet to the metal sheet with the adhesive layer to form the laminated structure. For example, as referenced by step 707 in FIG. 7 and as shown in FIG. 5, the step of attaching the glass sheet 209 to the metal sheet 503 can include providing the adhesive layer 211 on an inner surface 511 of the glass sheet 209. In addition or alternatively, the adhesive layer may be applied to the outer surface 505 of the metal sheet 503. As shown in FIG. 6, the glass sheet 209 and the metal sheet 207 can then be laminated together, for example, with a laminating roller 601 or other device. As shown, during the step of attaching the glass sheet 209 to the metal sheet 503 can be carried out such that a shape of the glass sheet 209 previously provided (e.g., see FIG. 5) is changed to substantially match a shape of the metal sheet (e.g., see FIG. 6). Indeed, as shown in the illustrated example, step of attaching shown in FIG. 6 can include the step of bending the glass sheet 209 to conform to a shape of the metal sheet 503. As such, the outer surfaces 603 of the conformed glass sheet 209 can include curves 602 that follow the curves 507 of the outer surface 606 of the metal sheet 503.

The curves 602, if provided, can have various curvatures generally defined by a radius of curvature of the glass Rg. In some examples, the radius of curvature may be maintained above a minimum value to reduce stress in the glass sheet during the step of bending. The minimum radius of curvature of the glass Rg can be selected to meet the following equality:

$$\frac{E \cdot t}{2Rg} \leq 15 \text{ MPa} \quad (1)$$

wherein "E" is the Young's Modulus of the glass, "t" is the thickness of the glass.

By using the equality (1) above, the glass sheet 209 may be bent to form a wide range of curvatures while still meeting the equality (1). For instance, assuming the Young's Modulus of the glass sheet 209 is 70 GPa and the thickness is 50 µm, the minimum curvature radius can be calculated as 116.7 mm. Considering a factor of safety, the radius of curvature Rg of the glass sheet 209 can be maintained above a minimum radius of curvature of 20 cm for the glass sheet having a thickness of 50 µm. For 50 µm and 150 µm thick glass sheet, the radius of curvature Rg of the glass sheet can be maintained above respective minimum radius of curvatures of 40 cm or 60 cm.

Once complete, as indicated by step 709, the step 707 of attaching can provide a laminated structure 501 wherein the shape of the glass sheet 209 (e.g., flat as shown in FIG. 5) can be bent to substantially match at least a portion of a shape of the outer surface 505 of the metal sheet 503. As such, a separate heated pre-forming step is not necessary to achieve the desired matched shape prior to attaching the glass sheet to the metal sheet. Rather, the metal sheet can act as a mold for the flexible glass sheet that may be bent about the contours of the outer surface 505 of the metal sheet 503 and held in place by the adhesive layer 211. As such, potential mismatching of the shapes of the metal sheet and the glass sheet is avoided. Moreover, expensive and time-consuming processing steps of heating the glass sheet to pre-form the glass sheet with a curved surface that matches the curved surface topography of the metal sheet 503 is likewise avoided. Rather, a glass sheet may be fabricated (e.g., by a down-draw process) and the shape of the glass sheet achieved during the downdraw process may be sufficient to quickly flex the glass sheet into a wide range of shape configurations without a separate heating step to pre-mold the glass sheet. In fact a pre-forming step for the glass sheet that is separate from the step of attaching the glass sheet to the metal sheet is not necessary. Rather, in accordance with aspects of the disclosure, the actual step of attaching the glass sheet to the metal sheet consequently results in the laminated structure including the desired shape configuration for the glass sheet.

Moreover, while the glass sheet is shown to conform to the outer surface 505, the glass sheet, in some examples, may be bent around the side surface and even back around the inner surface 509 in further examples where the bending radius is maintained above the minimum bending radius of the glass sheet.

While aspects of the disclosure can provide benefits for applications where it is desired to have a laminated structure with non-planar surfaces (e.g., curved surfaces), further aspects of the disclosure can provide benefits for applications where the glass sheet maintains substantially the same shape and is coupled with a metal sheet with a similar shape configuration. The laminated structure may have any non-planar or curved shape, such a simple curve with a single axis of curvature or a complex curvature with multiple axes of curvature or angled portions. For example, a central portion of the laminate may be planar or somewhat curved or bowed and one or more side portions may be rearwardly bent forming a beveled edge or a rounded corner and side wall portion. As referenced by step 711 in FIG. 7 and as shown in FIG. 3, the adhesive layer 211 may be applied to the substantially outer surface 301 of the metal sheet. In addition, or alternatively, the adhesive layer may be applied to an inner surface 511 of the glass sheet 209. As shown in FIG. 4, the glass sheet 209 and the metal sheet 207 can then be laminated together with a laminating roller 601 or other device, such that after the glass sheet 209 is attached to the metal sheet 207, the adhesive layer 211 includes the thickness T2 of about 300 µm or less, 100 µm or less, or 25 µm or less as discussed above for portable applications, such as mobile electronic devices, or up to 1.5 mm non-portable applications, such as large displays/electronics, appliances and structural or architectural applications.

In some examples, the process may end, as indicated by step 709 wherein the laminated structure 103 includes the final planar shape illustrated in FIG. 4. As such, in some examples, the glass sheet may maintain substantially the same shape (e.g., planar, curved or otherwise) during the step of attaching. Alternatively, the laminated structure 103 can include a subsequent processing step 713 wherein, after the step of laminating the glass sheet to the metal sheet with the adhesive layer, step 713 can optionally be provided to bend the laminated structure to a desired shape. For example, step 711 can be carried out to obtain the laminated structure 103 shown in FIG. 4. Next, the glass sheet and the metal sheet may be bent together to obtain the final shaped configuration shown in FIG. 6.

Figure 8:
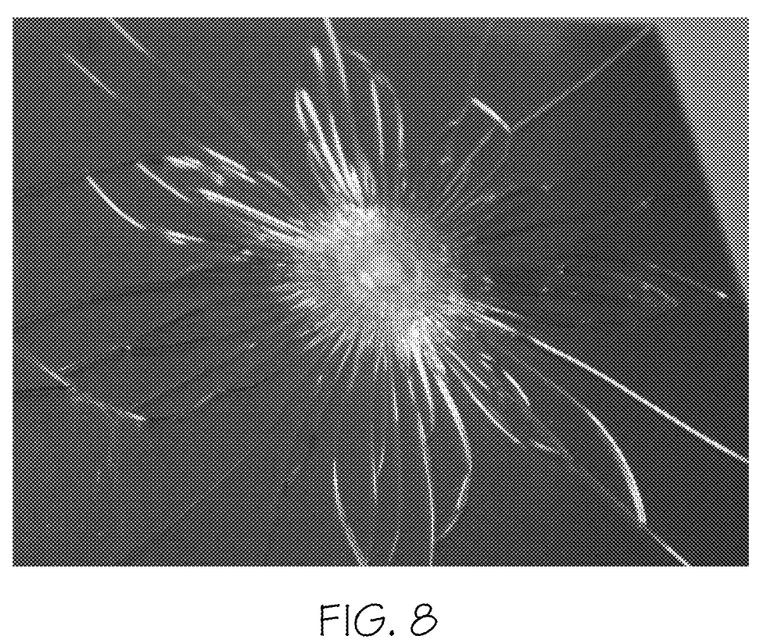
FIG. 8 illustrates the results of a breakage test performed on a laminated structure including a glass sheet having a thickness of 700 μm.
Figure 9:
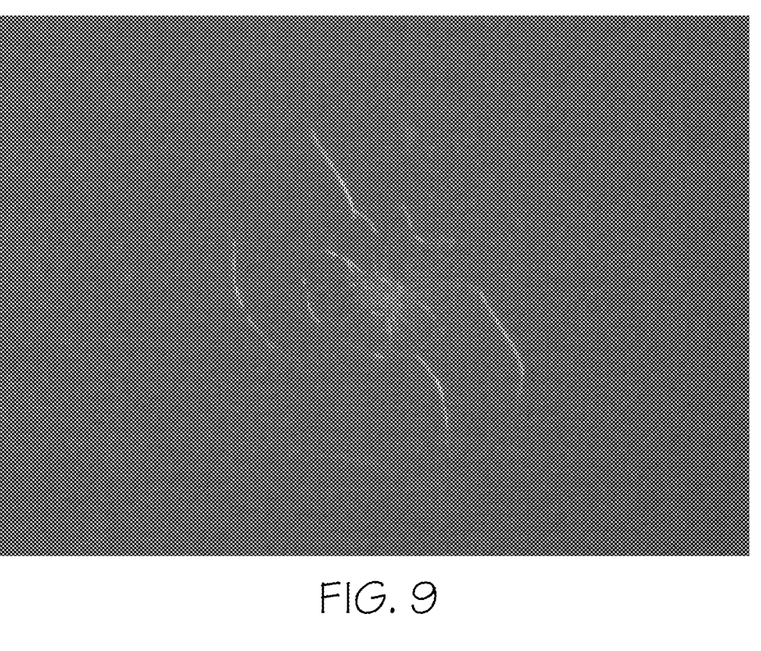
FIG. 9 illustrates the results of a breakage test performed on a laminated structure including a glass sheet having a thickness of 100 μm.

As mentioned above, glass sheets 209 of the laminated structures according to aspects of the disclosure can include a wide range of thicknesses T1. For example, as mentioned above, the thickness T1 of the glass sheet 209 can be less than 600 µm, such as about 300 µm or less, such as from about 50 µm to about 300 µm. Providing glass sheets 209 having a thickness T1 of less than 600 µm can result in a more desirable breakage pattern under failure conditions. FIGS. 8 and 9 illustrate a comparison of breakage patterns of glass/steel laminates wherein the glass sheet has a relatively high thickness (see FIG. 8) compared to a glass sheet with a relatively low thickness (see FIG. 9).

More particularly, FIG. 8 is an image showing the breakage behavior of a glass/steel laminate constructed of a glass sheet comprising Corning Gorilla® glass including a thickness of 700 µm, an adhesive layer with a thickness of 50 µm, and a 16 Gauge steel sheet. In comparison FIG. 9 is an image showing the breakage behavior of a glass/steel laminate constructed of a glass sheet including a thickness of 100 µm, an adhesive layer with a thickness of 50 µm, and a 16 Gauge steel sheet. The glass breakage was triggered by a 535 gram steel ball. As the image of FIG. 8 shows, breakage of a laminated structure with a thickness of 700 µm resulted in a significant portion of the fragments staying in place. However, the fragments of the breakage pattern of FIG. 8 resulted in relatively sharp surface characteristics from the glass fragments. In contrast, as the image of FIG. 9 shows, breakage of a laminated structure with a thickness of 100 µm also shows a significant portion of fragments staying in place. Moreover, unlike the breakage pattern of FIG. 8, the breakage pattern of FIG. 9 did not provide fragments with significant sharp surface characteristics.

Figure 10:
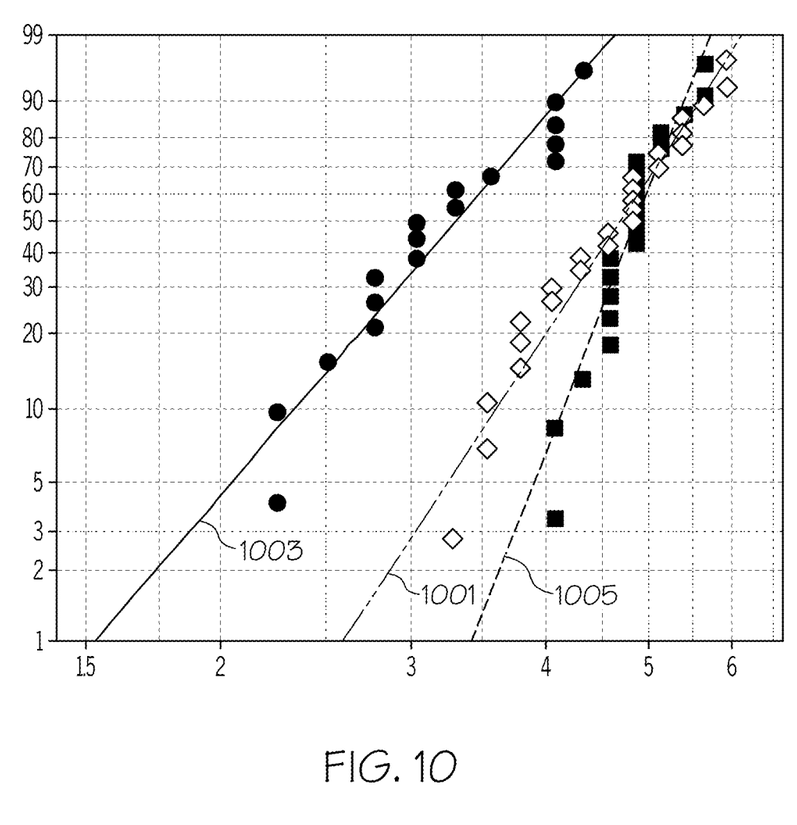
FIG. 10 illustrates a plot of percent failure at different breakage energies for various laminate structure configurations.

As further discussed above, an adhesive layer attaching the glass sheet to the metal sheet can include a thickness T2 of about 300 µm or less, 100 µm or less, or 25 µm or less, such as from about 20 µm to about 200 µm, such as from about 20 µm to about 100 µm, such as from about 20 µm to about 75 µm such as from about 25 µm to about 50 µm. More particularly providing the adhesive layer with lower thickness as discussed above, can provide the laminate structure with an enhanced impact resistance. For instance, FIG. 10 shows Weibull plots comparing the impact energy at breakage for various laminate structures. The vertical Y-axis is in (percent, %) while the horizontal X-axis represents energy at breakage (Joules). The plots demonstrate that laminate structures of the disclosure (e.g., see plots 1003 and 1005) provide comparably good impact resistance when compared to fully tempered 4 mm soda lime glass represented by plot 1001 in FIG. 10. Plot 1003 represents a laminate structure with a glass sheet having a thickness T1 of 100 µm, and adhesive layer having a thickness T2 of 50 µm, and a 16 Gauge steel sheet. Plot 1005 represents a laminate structure with a glass sheet having a thickness T1 of 100 µm, and adhesive layer having a thickness T2 of 25 µm, and a 16 Gauge steel sheet. The impact testing was conducted using a 535 gram steel ball with the glass laminate structures being supported by a one-inch thick foam. Impacting was carried out on the centers of the samples starting at 15 cm and increasing by 5 cm until the sample breaks. The energy data at breakage for each sample was collected and plotted in a Weibull format. As shown in FIG. 10 by plot 1005, laminate structures having an adhesive layer thickness of 25 µm have better impact resistance than that of fully tempered 4 mm soda lime (see plot 1001) or laminate structures with an adhesive layer thickness of 50 μm (see plot 1003).

The disclosure presents laminate structures including a glass sheet that is laminated to a metal sheet by way of an adhesive layer. The adhesive layer may be transparent such that the underlying metal sheet can be seen through the glass sheet and adhesive layer. The transparent adhesive layer may be clear, colored or provided with decorative patter or print. Alternatively, the adhesive layer may be translucent (for example frosted) or even opaque, and may be of any color or provided with a decorative pattern or print. Any suitable adhesive as is well understood in the art may be employed.

Aspects of the disclosure can provide glass sheets that may be cold formed to a non-flat surface topography of a metal sheet, thereby avoiding the drawbacks, time and expense associated with thermal pre-molding a glass sheet to a shape prior to attaching the sheet with the formed shape to the metal sheet with the presumed identical shape. Indeed, the manufacturing process does not require the involvement of thermal bending to pre-form the glass sheet. Rather, a single step of bending the glass sheet, for example under room temperature conditions well within the elastic region of the glass sheet, can be performed while the glass sheet is being attached to the metal sheet during a lamination procedure.

The disclosure further presents laminate structures that protect a metal sheet with a glass sheet to avoid scratching of the metal sheet and soiling the surface of the glass sheet. Indeed, any smudges or dirt may be easily removed from the surface of the glass sheet in a convenient manner that may be more difficult to remove from an unprotected metal surface. In some examples, the glass sheets can be laminated to a stainless steel metal sheet to provide an attractive look that has enhanced scratch resistance, and relatively easy cleanability, for example, with respect to fingerprints, oil smudges, microbial contaminants, etc. The glass sheet can thereby help preserve the aesthetic look of the stainless steel and can help facilitate cleaning and maintenance of the surface of the laminated structure.

Moreover, the glass sheet of the laminated structure can provided the stainless steel metal sheet with increased resistance to plastic deformation under sharp impact. As such, providing the laminate structure can permit the glass sheet to help shield the metal sheet from impacts that may otherwise dent or damage the metal sheet. The glass sheet can also increase the chemical/electrochemical stability when compared to a stainless steel metal sheet, thereby preserving the surface characteristics of the stainless steel.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A laminated structure comprising:
a metal sheet comprising a thickness T3 from 0.5 mm to 2 mm and having a predetermined non-planar shape;
a glass sheet comprising a thickness T1 of 200 μm or less and conforming to the predetermined non-planar shape of the metal sheet; and
an adhesive layer attaching the glass sheet to the metal sheet, the adhesive layer comprising a thickness T2 ranging from 300 μm to 1.5 mm;
wherein the the predetermined non-planar shape has a minimum radius of curvature Rg determined as a function of:

$$\frac{E \cdot T1}{2Rg} \leq 15 \text{ MPa}$$

wherein E represents Young's Modulus of the glass sheet.

2. The laminated structure of claim 1, wherein the thickness T1 of the glass sheet is 100 μm or less.

3. The laminated structure of claim 1, wherein the glass sheet comprises a glass chosen from soda lime, borosilicate, and alkaline earth boro-aluminosilicate glasses.

4. The laminated structure of claim 1, wherein the glass sheet is chemically strengthened.

5. The laminated structure of claim 1, wherein the metal sheet comprises steel.

6. The laminated structure of claim 1, wherein the metal sheet comprises aluminum.

7. A laminated structure comprising:
a metal sheet comprising a thickness T3 from 0.5 mm to 2 mm and having a predetermined shape;
an alkaline earth boro-aluminosilicate glass sheet comprising a thickness T1 of 200 μm or less and conforming to the predetermined shape of the metal sheet; and
an adhesive layer attaching the glass sheet to the metal sheet, the adhesive layer having a thickness T2 ranging from 300 μm to 1.5 mm.

8. The laminated structure of claim 7, wherein the thickness T1 of the glass sheet is 100 μm or less.

9. The laminated structure of claim 7, wherein the glass sheet is chemically strengthened.

10. The laminated structure of claim 7, wherein the metal sheet comprises steel or aluminum.

11. The laminated structure of claim 7, wherein the metal sheet comprises a predetermined non-planar shape.

12. The laminated structure of claim 11, wherein the glass sheet conforms to the predetermined non-planar shape of the metal sheet and has a minimum radius of curvature Rg determined as a function of:

$$\frac{E \cdot T1}{2Rg} \leq 15 \text{ MPa}$$

wherein E represents Young's Modulus of the glass sheet.

13. A laminated structure comprising:
an aluminum sheet comprising a thickness T3 from 0.5 mm to 2 mm and having a predetermined shape;
an alkaline earth boro-aluminosilicate glass sheet comprising a thickness T1 of 200 μm or less and conforming to the predetermined shape of the aluminum sheet; and
an adhesive layer attaching the glass sheet to the aluminum sheet, the adhesive layer having a thickness T2 ranging from 300 μm to 1.5 mm.

14. The laminated structure of claim 13, wherein the thickness T1 of the glass sheet is 100 μm or less.

15. The laminated structure of claim 13, wherein the glass sheet is chemically strengthened.

16. The laminated structure of claim 13, wherein the aluminum sheet comprises a predetermined non-planar shape.

17. The laminated structure of claim 16, wherein the glass sheet conforms to the predetermined non-planar shape of the aluminum sheet and has a minimum radius of curvature Rg determined as a function of:

$$\frac{E \cdot T1}{2Rg} \leq 15 \text{ MPa}$$

wherein E represents Young's Modulus of the glass sheet.

18. The laminated structure of claim 17, wherein the minimum radius of curvature Rg of the glass sheet is greater than 20 cm.

\* \* \* \* \*

UNITED STATES PATENT AND TRADEMARK OFFICE
CERTIFICATE OF CORRECTION

| | | |
|---|---|---|
| PATENT NO. | : 11,225,052 B2 | Page 1 of 1 |
| APPLICATION NO. | : 16/585885 | |
| DATED | : January 18, 2022 | |
| INVENTOR(S) | : Chowdhury et al. | |

It is certified that error appears in the above-identified patent and that said Letters Patent is hereby corrected as shown below:

On the Title Page

On the page 2, in Column 2, item (56) under "Other Publications", Line 15, delete "McGrawhill" and insert -- McGraw-Hill --.

In the Claims

In Column 10, Line 1, in Claim 1, delete "the the" and insert -- the --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*